(12) United States Patent
Moharram

(10) Patent No.: US 7,246,376 B2
(45) Date of Patent: Jul. 17, 2007

(54) METHOD AND APPARATUS FOR SECURITY MANAGEMENT IN A NETWORKED ENVIRONMENT

(75) Inventor: Omayma E. Moharram, Carleton Place (CA)

(73) Assignee: Nortel Networks Limited (CA)

( * ) Notice: Subject to any disclaimer, the term of this patent is extended or adjusted under 35 U.S.C. 154(b) by 806 days.

(21) Appl. No.: 10/115,561

(22) Filed: Apr. 3, 2002

(65) Prior Publication Data
US 2002/0163926 A1 Nov. 7, 2002

Related U.S. Application Data

(60) Provisional application No. 60/288,099, filed on May 3, 2001.

(51) Int. Cl.
*G06F 12/14* (2006.01)
(52) U.S. Cl. ............... 726/23; 726/11; 726/22
(58) Field of Classification Search ............. 726/13, 726/22, 11, 23
See application file for complete search history.

(56) References Cited

U.S. PATENT DOCUMENTS

| | | | | |
|---|---|---|---|---|
| 6,725,378 B1 * | 4/2004 | Schuba et al. | ............... | 726/13 |
| 6,880,090 B1 * | 4/2005 | Shawcross | ............... | 726/14 |
| 7,020,783 B2 * | 3/2006 | Vange et al. | ............... | 726/5 |
| 7,051,369 B1 * | 5/2006 | Baba | ............... | 726/23 |
| 2003/0237016 A1 * | 12/2003 | Johnson et al. | ............... | 714/4 |

\* cited by examiner

*Primary Examiner*—Kambiz Zand
*Assistant Examiner*—Ellen C. Tran
(74) *Attorney, Agent, or Firm*—McGuinness + Manaras LLP

(57) ABSTRACT

In a networked environment, where multiple Internet Service Providers and multi-vendor equipment are involved in e-Business services and applications offering, the risk of overloading the Internet devices are real and security management is a challenge. Internet device traffic overloads could result from spoof attacks, (Denial-of-Service (DoS) or Distributed DoS (DDoS) attacks), device failures, special events, or widespread loads above engineered levels. To solve the problem of Internet security management for integrated optical and wireless devices, a new apparatus and functions running on IP devices are defined in this invention. Each Internet device includes counters and thresholding feature to manage the security attacks and prevent failure of the device being attacked.

10 Claims, 4 Drawing Sheets

30

| | Content ID | Count | Threshold |
|---|---|---|---|
| Threatening Requests 34 | Content ID | Count | Threshold |
| | Content ID | Count | Threshold |
| | Content ID | Count | Threshold |
| Legitimate Requests 32 | Content ID | Count | Threshold |
| | Content ID | Count | Threshold |
| | Content ID | Count | Threshold |

METHOD AND APPARATUS FOR SECURITY MANAGEMENT IN A NETWORKED ENVIRONMENT

This application claims priority to a previously filed provisional application Ser. No. 60/288,099, filed May 3, 2001.

BACKGROUND OF THE INVENTION

This invention relates generally to telecommunications networks and, in particular, to security management and controls for broadband switching nodes, gateway devices, routers, and multimedia applications servers in an Internet.

As is known in the art, the Internet is a huge collection of globally interconnected computers networks. The computer networks include Internet devices such as switching nodes, gateways, servers or routers. Networks are interconnected by routers that route traffic from a source device (e.g., switching node) to a destination device (e.g., services server) passing through some number of intervening networks. The Internet devices have computing abilities and utilize protocols conforming to the open system interconnection (OSI) model of which the transmission control protocol over Internet protocol (TCP/IP) is a widespread implementation. All information transported over the Internet is parcelled into TCP/IP packets, which are routed to an intended destination.

Because of the low-cost, global access provided by the Internet, one desired use is in electronic business (e-Business) services and applications. For the purposes of this application, e-business services and applications shall be any type of process, communication or transaction that may be undertaken in a revenue generating business. Such service and applications include, but are not limited to telephony, facsimile, electronic-mail, data transfer, electronic-commerce, e-mobile, video-on-demand, remote access to business services (including Business-to-Business and Business-to-Consumer), and any kind of transactions that are used to access digitized information.

Electronic business (e-Business) services are increasing rapidly for businesses and consumers. But without security and trust, there wouldn't be a notable shift towards commercial and financial transactions on the Internet. As e-Business consumers take advantage of the permanent broadband access and connections to the Internet, they will face security challenges In today's network, security incidents with dialup access are limited because consumers dial-up for a service and then terminate the connection. Further, most digital subscriber line (DSL) and cable subscribers are permanently connected to the Internet without firewalls and they are vulnerable to security breaches.

The growth in public Internet use and the security concerns that exist created a strong demand for firewalls and other security capabilities for all broadband technologies including DSL, cable, and fixed and mobile wireless.

In the Internet, the traffic flows from multiple subscribers get aggregated over high-speed connections to backbone or core routers that transport such aggregated traffic over high-speed backbones. In this environment, service provider lacks the visibility into each individual subscriber's traffic flows. For example, while edge devices with Remote Authentication Dial-In User Service (RADIUS) provide service providers complete knowledge, control, and visibility of the subscriber and their traffic flows. Visibility of subscriber's traffic flows is not complete at other devices in the Internet, (e.g., services servers).

For Internet security management, edge device firewalls work as a form of perimeter defense to allow acceptable traffic, as defined by the service provider, and drops all other traffic before it enters the network. Firewalls perform this defensive function by monitoring packets and sessions, making decisions based on the established rules in order to determine the appropriate action to take.

There are various firewall products for enterprise, small, medium, large service providers, and also for personal computer (PC) users. These overlaid firewalls solutions complicate the service provider's network by increasing the cost of subscription per user, software updates, or network complexity. In a scenario in which the provider does not offer the firewall as part of their service offer, it is highly unlikely that the provider can support trouble calls nor validate whether the source of subscriber problems is due to network problems or the subscriber firewall configuration. In a scenario in which a service provider does provide personal firewalls, the provider will need to maintain records on individual firewalls and will be responsible for the software update, as appropriate.

In addition to the fact that the management and maintenance of firewalls in the Internet can be difficult, they often cannot protect the Internet against so-called "spoof" attacks. Spoof attacks involve sending traffic that appears to be a legitimate source IP address and therefore acceptable to the firewall, but the source address has been hijacked and used illegitimately. Even the most advanced firewalls can and have been spoofed by the serious hacker.

In today's network, providers use identity verification in order to validate users requesting access to their networks. The authentication mechanisms will take many forms and identification information will typically reside in a Remote Authentication Dial-In User Service (RADIUS) or other Authentication, Authorization, and Accounting (AAA) server.

Spoof attacks typically take advantage of the authentication mechanisms in order to cripple the server. The Internet Denial-of-Service (DoS) attacks prevent a target services device (or victim server) from performing its normal functions through the use of flooding of or irregular sizes of certain types of protocols, such as "Ping" requests aimed at the "victim" server. The DoS attacks are launched from a single machine to a specific server to overload the processor or monopolize the bandwidth for that server so that legitimate users cannot use the resource. Another type of spoof attack takes advantage of the Distributed DoS (DDoS) in much the same way, however, they are launched from multiple machines for the same intentions. Most of the DDoS attacks are done through propositioned code on the offending machine, also known as a "slave", so that the remote or "master" machine can command the "slave" to launch the attack at any time.

Because many attacks are bandwidth attacks, very few solutions are available to avoid such an attack. The attacks continue until all bandwidth and server resources are monopolized and no further traffic is permitted through. For broadband edge device, it is difficult for such attacks to quickly consume the entire bandwidth. Other devices in the Internet, including services servers will be victimized by the DoS and DDoS attacks and the device will fail.

Currently there is no way any device can entirely defend against DoS and DDoS attacks. Here, attacks come from thousands of computers fooled into launching the attacks on the services server.

SUMMARY OF THE INVENTION

It is an object of the present invention to provide a new and improved apparatus and functionality for IP-based network security management and overload controls for legitimate and threatening (or illegitimate) requests for content.

The invention, therefore, according to a first broad aspect provides a method for managing network security comprising the steps of: maintaining respective protocols counters for all contents (whether the request for content is threatening or legitimate) running on an IP device, where each counter identifies a specific content which is offered by the IP device, maintaining a threshold indicator for each counter per content stored by the IP device and throttling the traffic when the content requests caused its relevant counter to reach the pre-set value for its threshold level.

BRIEF DESCRIPTION OF THE DRAWINGS

The invention will be better understood from the following description of a preferred embodiment together with reference to the accompanying drawing, in which:

FIG. 3 illustrates exemplary components that are used in the present invention;

DETAILED DESCRIPTION

Figure 1:
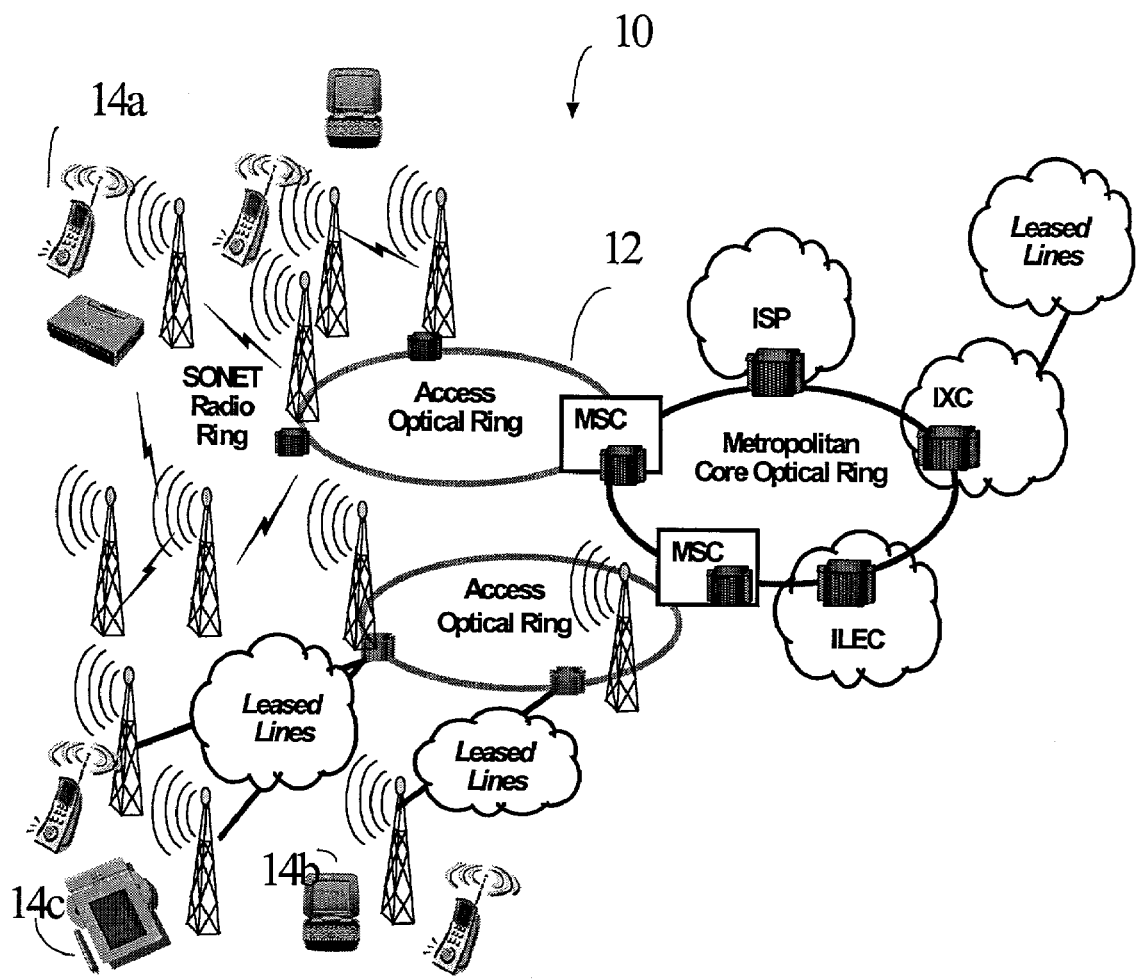
FIG. 1 is a schematic illustrating a typical Internet environment.

With reference to FIG. 1, as is well known, an exemplary multimedia telecommunications network 10 is shown. This telecommunications network 10 may be any type of landline, wireless or combination IP network interconnecting any type of transmitting devices. In one embodiment the network 10 of FIG. 1 includes an Integrated Optical and Wireless Internet 12, coupled to a plurality of wireless, optical or physically coupled devices 14a-14c. The Internet 12 may offer users immediate availability of electronic business (e-Business) services and applications including telephony, facsimile, electronic-mail, data transfer, electronic-commerce, e-mobile, video-on-demand, remote access to business services (including Business-to-Business and Business-to-Consumer), and any kind of digitized information. In FIG. 1, the Internet 12 is configured as access optical rings to the Mobile Switching Centres (MSCs), although such an arrangement is not a necessary limitation of the invention. The MSCs themselves are part of the metropolitan optical ring connecting to the Internet service providers (ISPs), Inter-exchange carrier (IXCs), and Incumbent local exchange carrier (ILEC).

According to one aspect of the invention, an Internet security management method and apparatus monitors and collects data at the various IP devices on threatening or legitimate traffic received at the device, and causes receipt of the traffic to be stopped, or throttled, if the traffic for an item of content exceeds a pre-determined set value. Throttling the receipt of threatening traffic increases the service reliability and security of an Internet device by preventing spoofing attacks from overloading the Internet device.

Figure 2:
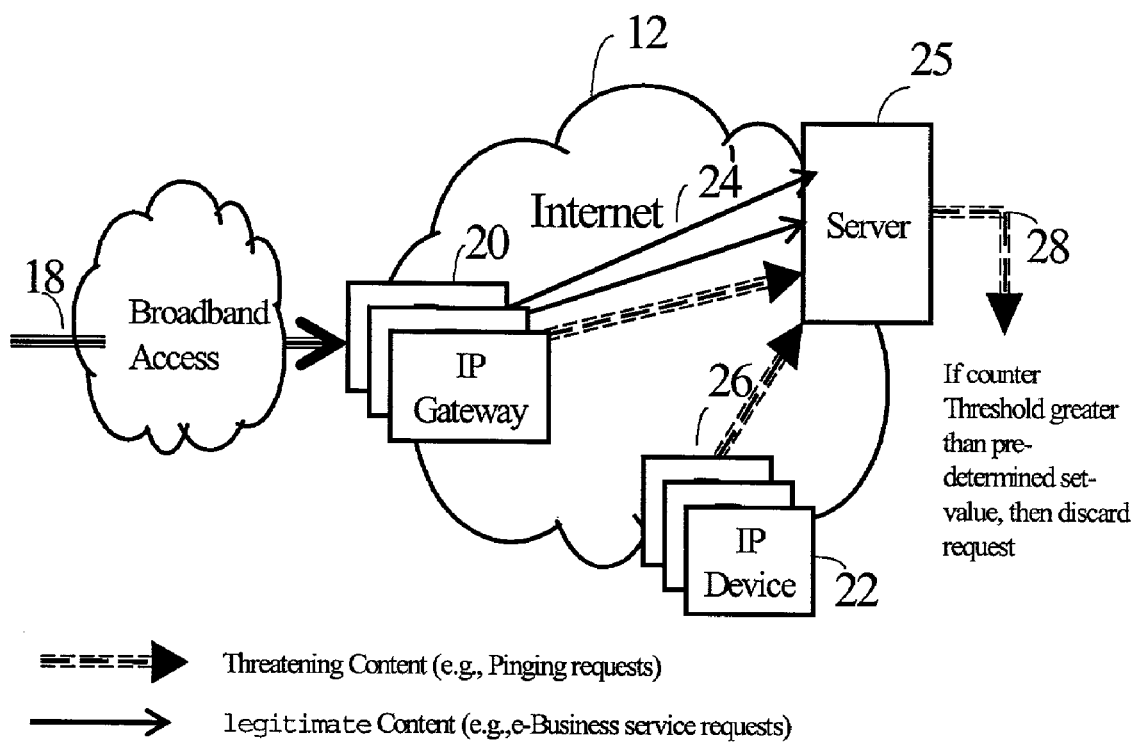
FIG. 2 is a schematic illustrating an exemplary embodiment of IP devices in accordance with the present invention that enables the Internet Service Provider (ISP) to block requests from their network and their subscribers.

Referring now to FIG. 2, an exemplary request flow in the Internet 12 is shown. Subscriber requests are received on input data stream 18. The requests may be legitimate requests from subscribers for content, or may include threatening requests; i.e., requests aimed at adversely affecting the performance of the devices in the Internet. In FIG. 2, the threatening requests are illustrated as double dashed lines, such as communication line 26, while legitimate requests are shown as straight lines such as line 24. Server 25 receives requests, both legitimate and threatening from IP gateway 20. Server 25 also receives threatening requests from IP device 22. As shown in FIG. 2, the server 25, implementing the present invention, monitors the threatening requests and discards requests for content when the requests have exceeded a pre-selected threshold.

Referring now to FIG. 3, an exemplary table that may be used by the server, such as server 25, for implementing the present invention are shown. As is known in the art, under the TCP/IP protocol, a content request includes the source device IP address (the IP address of the device issuing the request), the IP address of the destination device storing the desired content, and an identifier for the particular content at that device identifies a content information request.

In one embodiment of this invention, a counter is associated with each content identifier. Each time the content corresponding to the content identifier is requested, the associated content counter is incremented. In FIG. 3, table 30 is shown to include the content identifier 33 and content counter 35 for each content requested at the server 25.

Table 30 is shown apportioned into two sections; legitimate content identifiers 32 and threatening content identifiers 31. As discussed previously, certain types of content requests, such as Ping requests, and DDoS requests request certain content that is known to be used to adversely affect a device. In one embodiment, requests for this type of content are identified as "threatening" requests. Other types of requests for general content are referred to as legitimate requests.

In one embodiment, a threshold is stored in the table. The threshold is the maximum number of requests for the content that are responded to before the requests for that content are discarded or re-directed. In one embodiment, two thresholds are provided, one for threatening requests and another for legitimate requests. The threatening request threshold will likely be less than the threshold for legitimate request. In another embodiment, separate thresholds 36 may be provided for each type of content request. Such an embodiment is illustrated in FIG. 3.

The ISP programs the threshold values for threatening and legitimate requests. The optimal values for the thresholds can be determined by monitoring typical traffic on the network, to identify when content requests are higher than expected.

Threshold values for threatening requests differ from the threshold values for legitimate requests.

In one embodiment, a threshold indicator flag is stored with content identifier, and is set when the count exceeds the threshold. By storing a flag with the content identifier, it can be quickly determined that requests to the content should be re-directed or discarded.

When a threshold has been reached, one of two things can happen. For threatening requests, when a threshold is reached, any incoming requests for the content are discarded. For legitimate requests, the requests could be discarded, or, in an alternative embodiment, the extra requests are forwarded to its mated devices over the connecting data link as per the teaching of (MOHARRAM U.S. Pat. No. 5,825,860), incorporated herein by reference, and pending application Ser. No. 08/815,258, entitled "COMMUNICATIONS LINK INTERCONNECTING SERVICE CONTROL POINTS OF A LOAD SHARING GROUP FOR TRAFFIC MANAGEMENT CONTROL", filed on Mar. 11, 1997 by Moharram and incorporated herein by reference.

Figure 4:
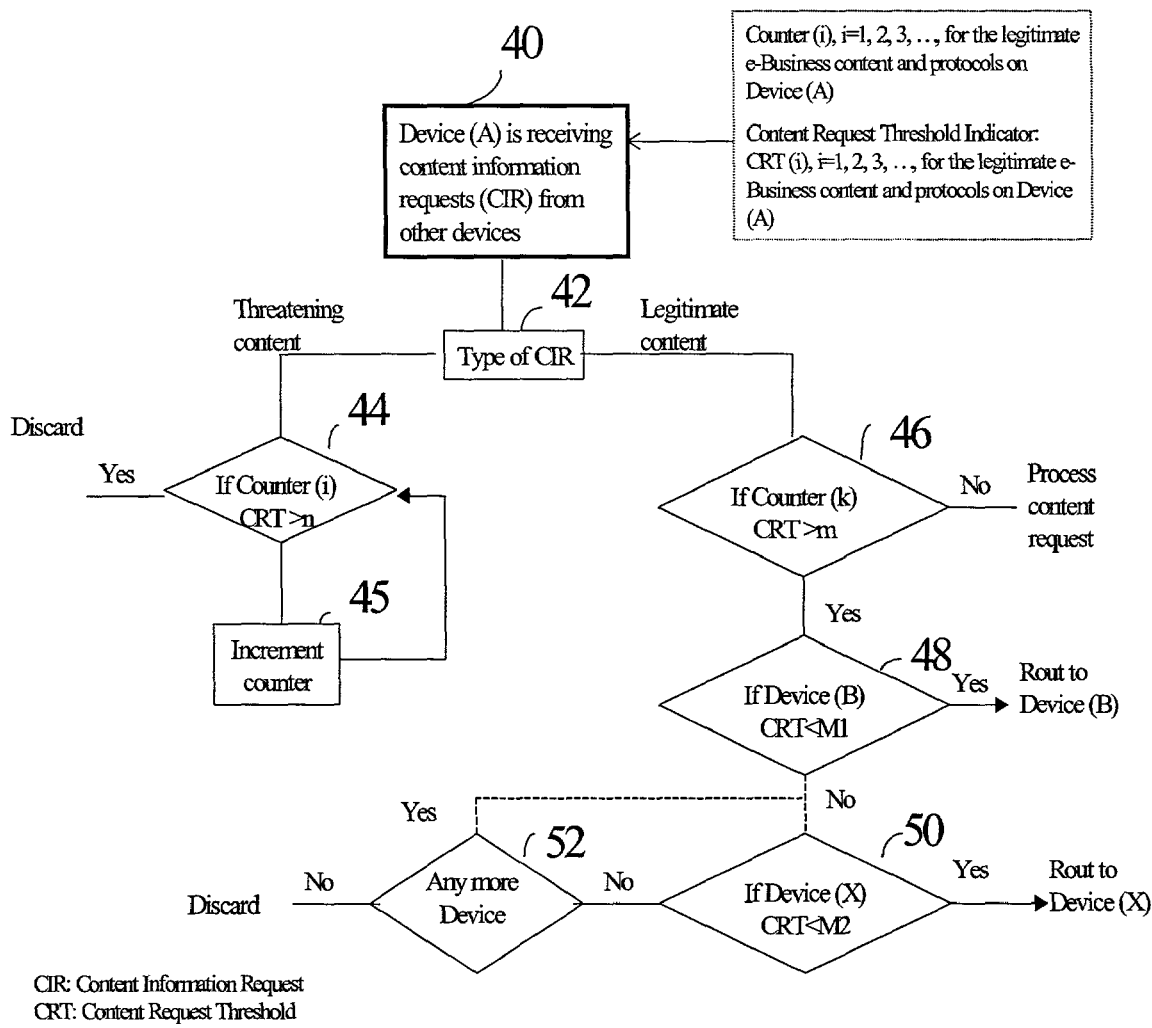
FIG. 4 is a flow diagram illustrating of the process flow for Internet security management with IP configured according to the present invention.

Referring now to FIG. 4, an exemplary flow chart illustrating the security management process of the present invention is shown. At step 40, the IP device receives content requests from other devices in the Internet. It should be noted the IP device might be any of the devices coupled in the Internet. At step 42, the content identifier is identified, and it is determined whether this is a legitimate or threatening request for content. If it is threatening request, at step 44 the counter associated with threatening content is compared against the threshold. If it is greater than the threshold, then the request is discarded. If it is less than the threshold, then, at step 45 the counter associated with the content is incremented If, at step 42 it is determined that the request for content is legitimate, then at step 46 it is determined whether the counter for the content has exceeded its threshold. If not, the request is processed. If at step 46 it is determined that the threshold has been exceeded, then the request is forwarded to IP device (B), and at step 48 the counter of mated IP device (B) is compared against its threshold for that content identifier. Again, if the threshold is not exceeded, it is processed at IP device (B). If so, it is forwarded to any other mated device. If the threshold has been exceeded at all the mated IP devices, the packet is discarded.

Accordingly, an Internet security management functionality process includes monitoring and control functions aimed at the detection of abnormal load conditions and excessive traffic congestion caused by specific content requests; activation of threshold mechanism that flags overload condition, activation and de-activation of a traffic throttling feature to discard excess content requests, when device congestion is detected by the threshold indicator. These controls minimize congestion conditions, due to spoof attacks, for example, at the device, and prevent the congestion from spreading to the subtending devices and throughout the rest of the network.

Persons possessing ordinary skill in the art to which this invention pertains will appreciate that various modifications and enhancements may be made without departing from the spirit and scope of the claims that follow. The various hardware and software configurations that have been disclosed above are intended to educate the reader about preferred and alternative embodiments, and are not intended to constrain the limits of the invention.

I claim:

1. A device for communicating with a network, the device storing content accessible by other devices communicating with the network, the device including:
    a first counter associated with a first content identifier, the first content identifier associated with a first type of content used to adversely affecting the performance of the device;
    a first threshold value associated with the first counter;
    a second counter associated with a second content identifier, the second content identifier being associated with a second type of content, the second type of content being general content, and a request for the general content being a legitimate request;
    a second threshold value associated with the second counter, wherein the second threshold is determined by monitoring traffic to identify an expected number of legitimate requests for the general content, and wherein the second threshold value is higher than the expected number of requests;
    means for incrementing the first counter in response to receipt of a threatening request including the first content identifier and for incrementing the second counter in response to receipt of a legitimate request including the second content identifier;
    means for discarding the threatening request in response to the value of the first counter exceeding the first threshold value; and
    means for discarding the legitimate request in response to the value of the second counter exceeding the second threshold value.

2. The device of claim 1, wherein the first threshold value and second threshold value are different.

3. The device of claim 1, further comprising a threshold indicator flag for each of the first and second threshold values, for indicating when the respective count has exceeded the associated threshold value.

4. The device of claim 1, wherein the device is a wireless device.

5. The device of claim 1, wherein the device is an IP device.

6. The device of claim 1, wherein the content is e-business content.

7. A method for preventing traffic congestion at a device communicating with a network, the method comprising the steps of:
    monitoring requests for content at the device, the requests including threatening requests for a first type of content used to adversely affecting the performance of the device and legitimate requests for a second type of content comprising general content;
    for each request,
    incrementing a counter associated with a content identifier of the each request;
    discarding requests for the content when the counter associated with the content identifier exceeds a predetermined value, wherein the predetermined value is related to whether the content identifier is associated with a first type of content or a second type of content and is determined by monitoring traffic at the device for an expected number of requests for the content and wherein the predetermined value is greater than the expected number of requests.

8. A network comprising:
    at least two devices, communicating with each other via the network, each of the devices storing a plurality of content accessible by the other device each content of the plurality of content referenced by a content identifier associated with a type of the content, at least one of the devices including:
    a counter associated with the content identifier and a threshold value associated with the content identifier, wherein the threshold value is determined by monitoring traffic in the network to identify an expected number of requests for the content, and wherein the threshold exceeds the expected number of requests;
    means for incrementing the counter associated with the content in response to a request for the content that includes the content identifier; and
    means for discarding requests to the content in response to a value of the counter exceeding the threshold and the content being used to adversely affect the performance of the device.

9. The network of claim 8, wherein the network is an integrated optical and wireless network.

10. The network of claim 8, further including means for re-directing the request to another one of the at least two devices in the network, and wherein the at least two devices are load-sharing devices.

* * * * *